US008977427B2

(12) United States Patent
Scott

(10) Patent No.: US 8,977,427 B2
(45) Date of Patent: Mar. 10, 2015

(54) SYSTEM, METHOD AND ODOMETER MONITOR FOR DETECTING CONNECTIVITY STATUS OF MOBILE DATA TERMINAL TO VEHICLE

(71) Applicant: Webtech Wireless Inc., Burnaby (CA)

(72) Inventor: Michael Scott, Coquitlam (CA)

(73) Assignee: Webtech Wireless Inc., Burnaby (CA)

( * ) Notice: Subject to any disclaimer, the term of this patent is extended or adjusted under 35 U.S.C. 154(b) by 0 days.

(21) Appl. No.: 14/047,248

(22) Filed: Oct. 7, 2013

(65) Prior Publication Data

US 2014/0094995 A1 Apr. 3, 2014

Related U.S. Application Data

(63) Continuation-in-part of application No. 13/228,314, filed on Sep. 8, 2011, now Pat. No. 8,583,319.

(51) Int. Cl.
*G01M 17/00* (2006.01)
*G07C 5/00* (2006.01)

(52) U.S. Cl.
CPC ................ *G07C 5/008* (2013.01); *G07C 5/002* (2013.01)
USPC ................................ 701/33.9; 701/1; 701/36

(58) Field of Classification Search
USPC ........................................ 701/1, 35, 36, 33.9
See application file for complete search history.

(56) References Cited

U.S. PATENT DOCUMENTS

| | | | | |
|---|---|---|---|---|
| 7,538,667 | B2 | 5/2009 | Koen | |
| 7,881,838 | B2 * | 2/2011 | Larschan et al. | 701/29.2 |
| 2007/0050108 | A1 | 3/2007 | Larschan et al. | |
| 2008/0255722 | A1 * | 10/2008 | McClellan et al. | 701/35 |
| 2008/0262670 | A1 * | 10/2008 | McClellan et al. | 701/29 |
| 2009/0299567 | A1 * | 12/2009 | Larschan et al. | 701/33 |

OTHER PUBLICATIONS

Non-Final Office Action with a notification date of Feb. 20, 2013 issued for parent U.S. Appl. No. 13/228,314.

(Continued)

*Primary Examiner* — Mary Cheung
*Assistant Examiner* — Michael Berns
(74) *Attorney, Agent, or Firm* — John R. Flanagan

(57) ABSTRACT

An odometer monitor for monitoring the connectivity status of a mobile data terminal to a vehicle is a module defined in a data processor of the mobile data terminal. The monitor is operable to detect successive timed poll events originating in the mobile data terminal and listen for arrival of corresponding odometer update values from a vehicle tracking device connected to an information bus of the vehicle. Successive odometer updates are compared to calculate the distances travelled between updates, and to make a determination of connectivity status of the mobile data terminal relative to the vehicle based on whether or not the calculated distances are above or below a preset maximum distance. The odometer monitor can verify whether the mobile data terminal remains connected to the same vehicle by checking a vehicle identity module, which may be located in the vehicle tracking device.

17 Claims, 16 Drawing Sheets

(56) References Cited

OTHER PUBLICATIONS

Applicant Response to Non-Final Office Action with an official receipt date of May 28, 2013 issued for parent U.S. Appl. No. 13/228,314.

Webtech Wireless Inc. "WebTech Wireless Launches Quadrant Transportation Solution Products Aimed at Trucking Industry Safety and Security at NPTC", retrieved from http://www.webtechwireless.com/data/news/ webtech_wireless_launches_quadrant_transportation_solution_products_aimed_at_trucking_industry_safet_16_591. php on Oct. 6, 2013.

* cited by examiner

SYSTEM, METHOD AND ODOMETER MONITOR FOR DETECTING CONNECTIVITY STATUS OF MOBILE DATA TERMINAL TO VEHICLE

CROSS-REFERENCE TO RELATED APPLICATIONS

This application is a continuation in part of, and claims priority from, U.S. patent application Ser. No. 13/228,314 filed on Sep. 8, 2011, which is incorporated herein by reference in its entirety.

TECHNICAL FIELD

The subject matter of the present invention is directed generally to employment of a mobile data terminal (MDT) to monitor use of a vehicle and, more particularly, is concerned with a system, method and odometer monitor for detecting connectivity status of the MDT to the vehicle for uncovering un-reported periods of vehicle motion and also determining driver status during such periods.

BACKGROUND ART

An electronic on-board recorder (EOBR) is an electronic device, being one type of mobile data terminal (MDT), attached to a commercial motor vehicle, which is used to record the amount of time a vehicle is being driven. The driving hours of commercial drivers (truck and bus drivers) are regulated by a set of rules known as the hours of service (HOS). HOS rules are intended to prevent driver fatigue, by limiting the amount of time drivers spend operating commercial vehicles. An automatic on-board recorder (AOBR) is another type of MDT that may be used, which is comparable to an EOBR in terms of capabilities. Hereinafter, for the purpose of brevity, the designation MDT will be employed to mean either an EOBR or AOBR.

In order for the MDT to be considered compliant and useable as required by jurisdictional regulations, the device must be integrally synchronized with the operation of the vehicle so that the device is able to detect when the vehicle is in motion (in other words, be able to track all vehicle motion), and collect odometer data. The MDT must also be able to detect when integral synchronization is compromised (i.e. disconnected), report and record when integral synchronization is compromised, and report and record when integral synchronization is restored. The two reasons for reporting disconnections and reconnections are to inform the driver if/when something fails in the MDT so that appropriate backup actions can be taken, and to inform an inspector when a driver intentionally attempted to hide driving activity (in other words, when the MDT was unable to monitor motion and indicate possible tampering and ghost trip attempts).

FIG. 1 illustrates a typical prior art vehicle tracking and monitoring system, generally designated 10. The system 10 meets the aforementioned integral synchronization requirements with respect to operation of a given vehicle, that is, it can detect when the vehicle is in motion and collect odometer data. In the system 10, a software application (not shown) running in a user interface (not shown) in a MDT 12 (either in the form of an EOBR or AOBR device) monitors driver status reported through the user interface and also vehicle state data as reported by a vehicle tracking device (VTD) 14. The MDT 12 records changes in these monitored values as a driver's record of duty status (RODS), which is recorded in a data store 12A of the MDT 12 for future display to an inspector.

The VTD 14 is interfaced with a vehicle information bus (VIB) 16 and a global positioning system (GPS) receiver 18 by a combination of hardware and firmware (not shown). The VIB 16 is an information network installed in the vehicle, for example by the vehicle manufacturer, which provides access to operational and diagnostic information over standard protocols, such as OBDII, JBUS or CAN BUS. The VTD 14 is a known device commonly referred to as a locator device, which is described in detail in U.S. Pat. No. 7,538,667 issued to same assignee as the subject application. The disclosure of said patent is incorporated herein by reference thereto.

GPS satellites broadcast signals that can be received and processed by the system 10 to derive latitude, longitude and current time with respect to the location of the vehicle. The GPS receiver 18 includes a processor (not shown) that can receive and interpret the signals broadcasted from the GPS satellites and provide the location (latitude and longitude) of the vehicle and current time. Data processor hardware and firmware of the VTD 14 monitors and interprets signals and protocols from the VIB 16 and the GPS receiver 18 in order to obtain data with respect to the given vehicle such as current Speed, Odometer, Location and Time for use by the MDT 12. Power is drawn from a vehicle battery 20 for operation of the system 10.

Constant power connections via PWR inputs and ignition-switched power connections via IGN SENSE inputs on both the MDT 12 and VTD 14 are made with the vehicle battery 20. These constant power connections from the vehicle battery 20 to the MDT 12 and VTD 14 are made through respective protective fuses 22, 24. These ignition-switched power connections from the vehicle battery 20 to the MDT 12 and VTD 14 are made through respective protective fuses 26, 28. An ignition switch 30 is operated by the driver of the given vehicle to start and stop the vehicle engine or motor.

In order to understand where potential problems can arise in detecting the connectivity status of the MDT 12, first the operation of the system 10 during its Start Up, Monitoring and Shut Down phase need to be described. It is during these phases when disconnection of connectivity, whether intentional or not, is likely to occur.

The Start Up phase of the system 10 has a VTD startup mode and a MDT startup mode. In the VTD startup mode, the driver activates the ignition switch 30 to start the engine. As a consequence, the VTD 14 detects power on its IGN SENSE input, wakes up from its low power consumption mode, powers up the GPS receiver 18, and initializes itself. If the VTD 14 does not have an internal battery (which is optional) or at this time its internal battery is exhausted, then the VTD 14 will not have a current time and must initialize its clock from the GPS receiver 18. Even with the GPS receiver 18 at power, it can still require as much as ten seconds for the GPS receiver 18 to first acquire satellite signals and resolve a location and current time. In the MDT startup mode, the MDT 12 detects the same ignition on event via its IGN SENSE input, wakes up from its low power consumption mode, and displays a user interface to the driver.

The Monitoring phase of the system 10 has a VTD monitoring mode and a MDT monitoring mode. Once the VTD 14 is powered up and initialized, it starts monitoring vehicle activities. In the VTD monitoring mode, regularly polling of the GPS receiver 18 and VIB 16 occur to obtain current values for Speed, Odometer, Time and Location (Latitude and Longitude). Changes in the Speed are further interpreted by the VTD 14 resulting in a Vehicle State with values of Going or Stopped. In the MDT monitoring mode, after wake-up the MDT 12 polls the VTD 14 for current Time, Location, Vehicle State and Odometer data. When the Vehicle State changes from Stopped to Going, a RODS is recorded in the data store 12A of the MDT 12 indicating the driver has started Driving. When the Vehicle State changes from Going to Stopped, a RODS is recorded in the data store 12A indicating the driver is On Duty Not Driving. Every RODS is recorded in the data store 12A with Time, Location and Odometer values most recently obtained from the VTD 14. Additional duty status values, not relevant to this discussion, may be inputted by the driver and recorded in the data store 12A.

The Shut Down phase of the system 10 has a VTD shutdown mode and a MDT shutdown mode. In the VTD shutdown mode, the driver deactivates the ignition switch 30 to shutoff the engine. As a consequence, the VTD 14 detects power loss on its IGN SENSE input and proceeds to shutdown with a return to its low power consumption mode. A delay exists between detection of the ignition off event and the shutdown but in the end the VTD 14 stops polling the VIB 16 and GPS receiver 18, powers down the GPS receiver 18, stops responding to MDT data requests and goes to sleep. In the MDT shutdown mode, the MDT 12 detects the same ignition off event via its IGN SENSE input and initiates a similar shutdown sequence to return to its low power consumption mode. A delay exists between detection of the ignition off event and the shutdown but in the end the MDT 12 stops polling the VTD 14 and goes to sleep.

FIG. 2 illustrates a modification of the prior art vehicle tracking and monitoring system of FIG. 1, now generally designated 10A. The system 10A is modified to incorporate a hardware based disconnection monitor in the form of a specialized interconnection cabling 32A of the connection 32. The cabling 32A is used in conjunction with a digital input on the VTD 14 to detect disconnections between the MDT 12 and the VTD 14. The cabling 32A includes an additional wire 34 carrying power to a digital input of the VDT 14 from the constant battery power connection to the PWR input of the MDT 12. The digital input of the VDT 14 is held High (positive voltage) while the MDT 12 is powered and connected. The digital input of the VDT 14 drops Low (zero voltage) when either the MDT 12 is disconnected or the MDT power is removed.

When the MDT constant battery power to the VTD 14 via the wire 34 of the cabling 32A is cut by removal of the fuse 22, the VTD 14 detects the loss of power on the digital input and caches a disconnection event. When MDT constant battery power to the VTD 14 via the wire 34 of the cabling 32 is restored by replacement of the fuse 22, the VTD 14 detects the power on the digital input and caches a reconnection event. These events are communicated to the MDT 12 and recorded in the data store 12A of the MDT 12 as Device Disconnection and Reconnection records the next time the MDT 12 establishes communications with the VTD 14. When the cabling 32A is disconnected at either end, the VTD 14 detects loss of power on the digital input and caches a disconnection event. When the cabling 32A is reconnected, the VTD 14 detects power on the digital input and caches a reconnection event. These events are communicated to the MDT 12 and recorded in the data store 12A as Device Disconnection and Reconnection records the next time the MDT 12 establishes communications with the VTD 14.

However, the modified system 10A is not able to detect when the MDT 12 ignition sense is affected by removal of the fuse 26. In this case the MDT 12 will remain in power save mode and not track or record changes in vehicle state. Also, the modified system 10A is not able to detect when the VTD power fuse 24 or ignition fuse 28 are affected. In these cases the VTD 14 is powered off or asleep and the MDT 12 will not be able to track vehicle state changes. Additional features are necessary within the MDT 12 to record when communications fail to the VTD 14. Further, the modified system 10A is not able to detect disconnections of the connection 36 between the VIB 16 and the VTD 14. In these cases the vehicle will appear to not be moving when it is. GPS data could be used in conjunction to detect vehicle motion but GPS jamming will compromise that solution as well.

FIG. 3 illustrates another modification of the prior art vehicle tracking and monitoring system of FIG. 1, now generally designated 10B. The system 10B is modified to incorporate a time based polling disconnection monitor 38 in the form of a software module within the MDT 12 to store the time of each poll response received from the VTD 14. This is called Time of Last Contact. Polling occurs at a fixed frequency so there is an expected period between polls. The duration between polls is compared to the expected poll period. When the duration exceeds the expected period, the polling monitor 38 can assume that a disconnection occurred at some time between the Time of Last Contact and the current poll attempt and record a Device Reconnection record in the data store 12A of the MDT 12 that also reports when the last contact was.

When the MDT power at the PWR input or the ignition sense at the IGN SENSE input of the MDT 12 is affected by removal of either the fuse 22 or fuse 26, the MDT 12 and its polling monitor 38 are not operational. No detection can occur at that time, not until the affected power or ignition sense is restored and the polling sensor of the monitor 38 detects a lengthy period of time elapsed since the Time of Last Contact and produces a Device Reconnection record. This requires use of non-volatile RAM to store the Time of Last Contact. When the cabling 32 (see FIG. 3) between the MDT 12 and VTD 14 is disconnected, the polling sensor of the monitor 38 will quickly detect a lengthy period of time since Time of Last Contact and produce a Device Disconnection record. When the cabling 32 is restored, the polling sensor of the monitor 38 is able to detect this as well and produce the Device Reconnection record. When the VTD power at the PWR input or the ignition sense at the IGN SENSE input of the VTD 14 is affected by removal of either the fuse 24 or fuse 28, the polling sensor of the monitor 38 will quickly detect a lengthy period of time since Time of Last Contact and produce a Device Disconnection record. Restoring the power or ignition sense will also be detected by the polling sensor and a Device Reconnection record produced.

However, the modified system 10B is not able to detect disconnections of the connection 36 of the VIB 16 with the VTD 14 and in these cases the vehicle will appear to not be moving even when it is. Additional logic is necessary in the VTD 14 to use GPS data in conjunction with VIB motions to detect vehicle motion but methods of GPS jamming will compromise that solution as well. Furthermore, the modified system 10B will detect natural power cycles as disconnection and reconnection events which when examined after the fact will make it extremely difficult to distinguish a tampering disconnection and reconnection sequence from a natural power cycle disconnection and reconnection sequence.

There is therefore a need for an innovation that solves the aforementioned problems of detecting connectivity of the MDT to the vehicle without producing false events that would add noise and make it difficult for an inspector to identify the real tampering and ghost trips.

SUMMARY OF THE INVENTION

The subject matter of the present invention provides such innovation that, by employment of the vehicle odometer values, can detect if the MDT was disconnected from the vehicle and the vehicle moved during that time by more than a normal (or expected) distance. No problem arises from disconnecting and reconnecting a MDT when the vehicle does not move or moves less than the normal (expected) distance. This typically occurs during maintenance or repairs of vehicle or MDT and it may also occur by accident if a power or data cable comes loose from the back of the MDT. Only when the vehicle is moved is a MDT disconnection a concern for an inspector because while the MDT is disconnected the vehicle motion and driver status goes unrecorded. By interposing an odometer based disconnection monitor approach, any MDT disconnections during time of no vehicle movement or vehicle movement over a distance below the normal (expected) distance will not result in a disconnection event.

One aspect of the present invention is a system for monitoring the connectivity status of a mobile data terminal to a vehicle. The system includes: a vehicle tracking device connectable to a vehicle information bus of a vehicle and operable to receive odometer update values from the vehicle via said bus; a vehicle identity module in the vehicle tracking device for storing an identification of the vehicle; a mobile data terminal connected to the vehicle tracking device and operable to receive odometer update values from the vehicle tracking device; and a preset maximum distance defined in the mobile data terminal. The mobile data terminal is operable to: detect a series of timed poll events originating in the mobile data terminal; receive an odometer update value from the vehicle tracking device corresponding to each poll event; verify that a last and a penultimate of said odometer update values are from the vehicle; calculate a distance between the last and penultimate odometer update values; and make a determination of connectivity status of said mobile data terminal relative to the vehicle based on whether the distance is greater than or less than the preset maximum distance.

Another aspect of the present invention is a method for monitoring the connectivity status of a mobile data terminal to a vehicle. The method includes the steps of: defining a preset maximum distance in a mobile data terminal connectable to a vehicle; detecting a series of timed poll events originating in the mobile data terminal; receiving an odometer update value from a vehicle tracking device corresponding to each poll event; verifying that a last and a penultimate of said odometer update values are from the vehicle; calculating a distance between the last and penultimate odometer update values; and making a determination of connectivity status of the mobile data terminal relative to the vehicle based on whether the distance is greater than or less than the preset maximum distance.

Still another aspect of the present invention is an odometer monitor for monitoring the connectivity status of a mobile data terminal to a vehicle. The monitor is a software module defined one or more non-transitory computer readable media comprising computer readable instructions, which, when executed by a processor cause a mobile data terminal in a vehicle to perform various operations. The mobile data terminal is configured to: define a preset maximum distance; detect a series of timed poll events; receive an odometer update value from a vehicle tracking device corresponding to each poll event; verify that a last and a penultimate of said odometer update values are from the vehicle; calculate a distance between the last and penultimate odometer update values; and make a determination of connectivity status of the mobile data terminal relative to the vehicle based on whether the distance is greater than or less than the preset maximum distance.

BRIEF DESCRIPTION OF THE DRAWINGS

For clarity, the drawings herein are not necessarily to scale, and have been provided as such in order to illustrate the principles of the subject matter, not to limit the invention.

DESCRIPTION OF EMBODIMENTS

Figure 1:
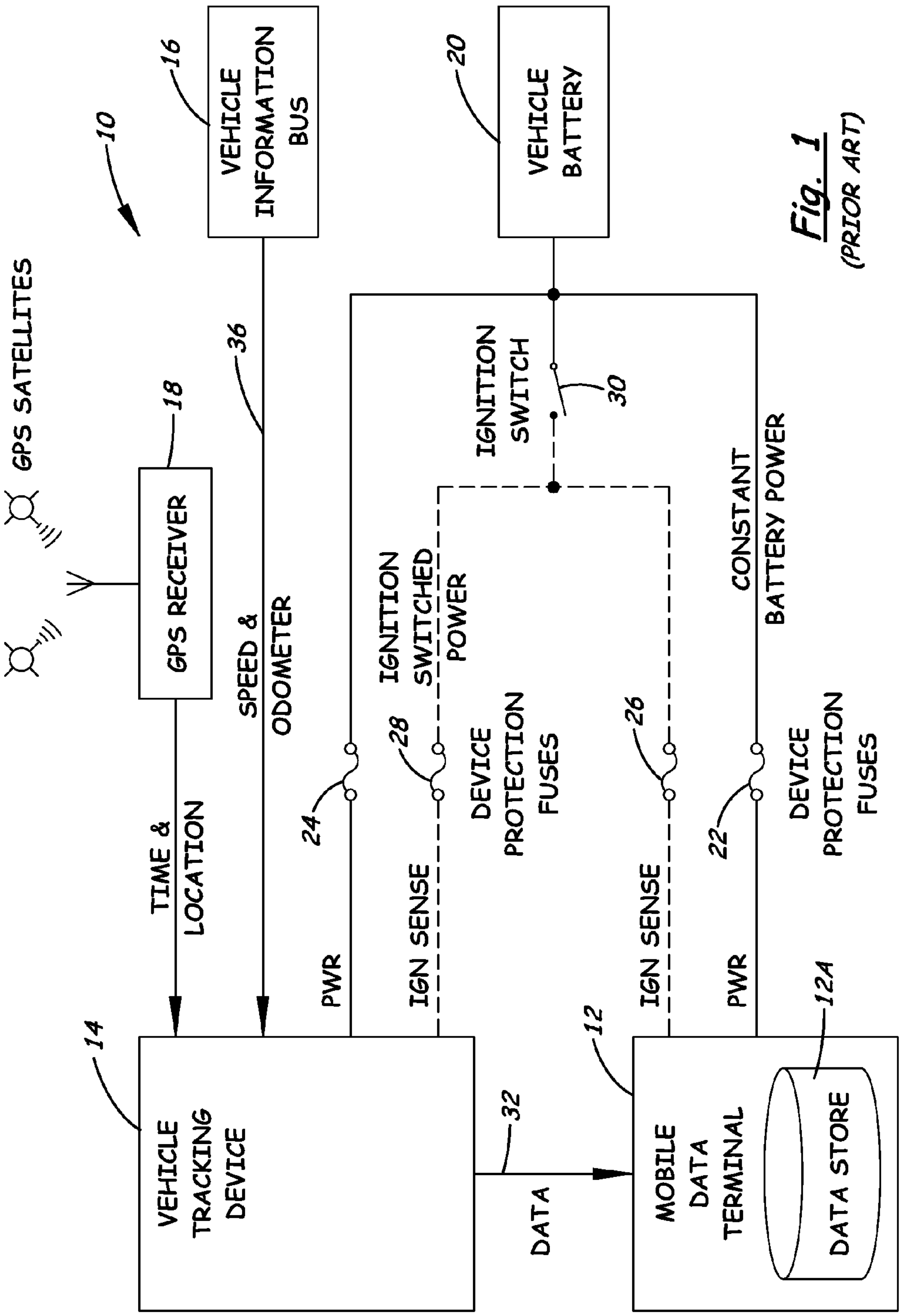
Fig. 1 (PRIOR ART)
FIG. 1 is a block diagram representation of a typical prior art vehicle tracking and monitoring system.
Figure 2:
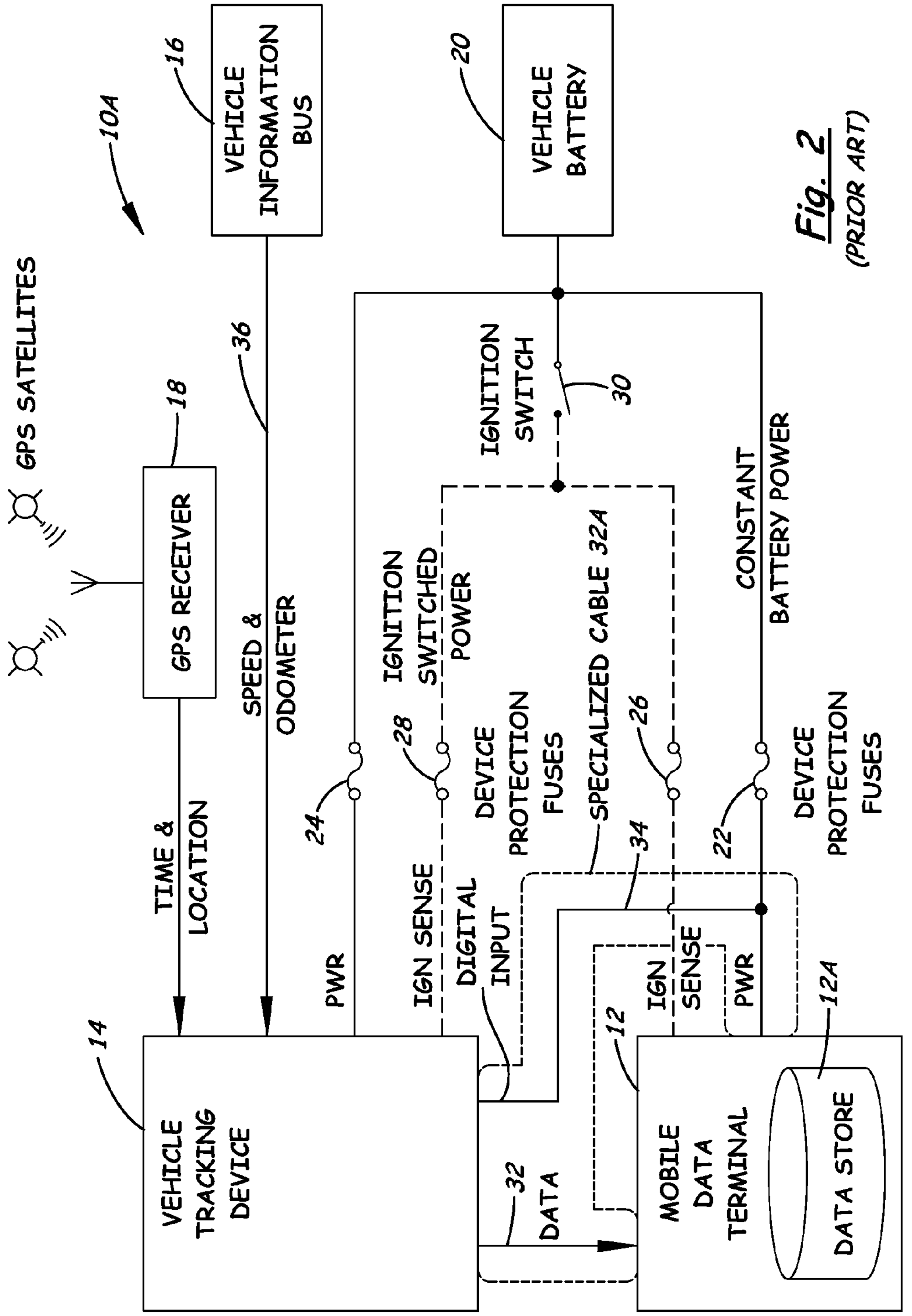
Fig. 2 (PRIOR ART)
FIG. 2 is a block diagram representation of a prior art vehicle tracking and monitoring system similar to that of FIG. 1 but after modification to incorporate a hardware based disconnection monitor.
Figure 3:
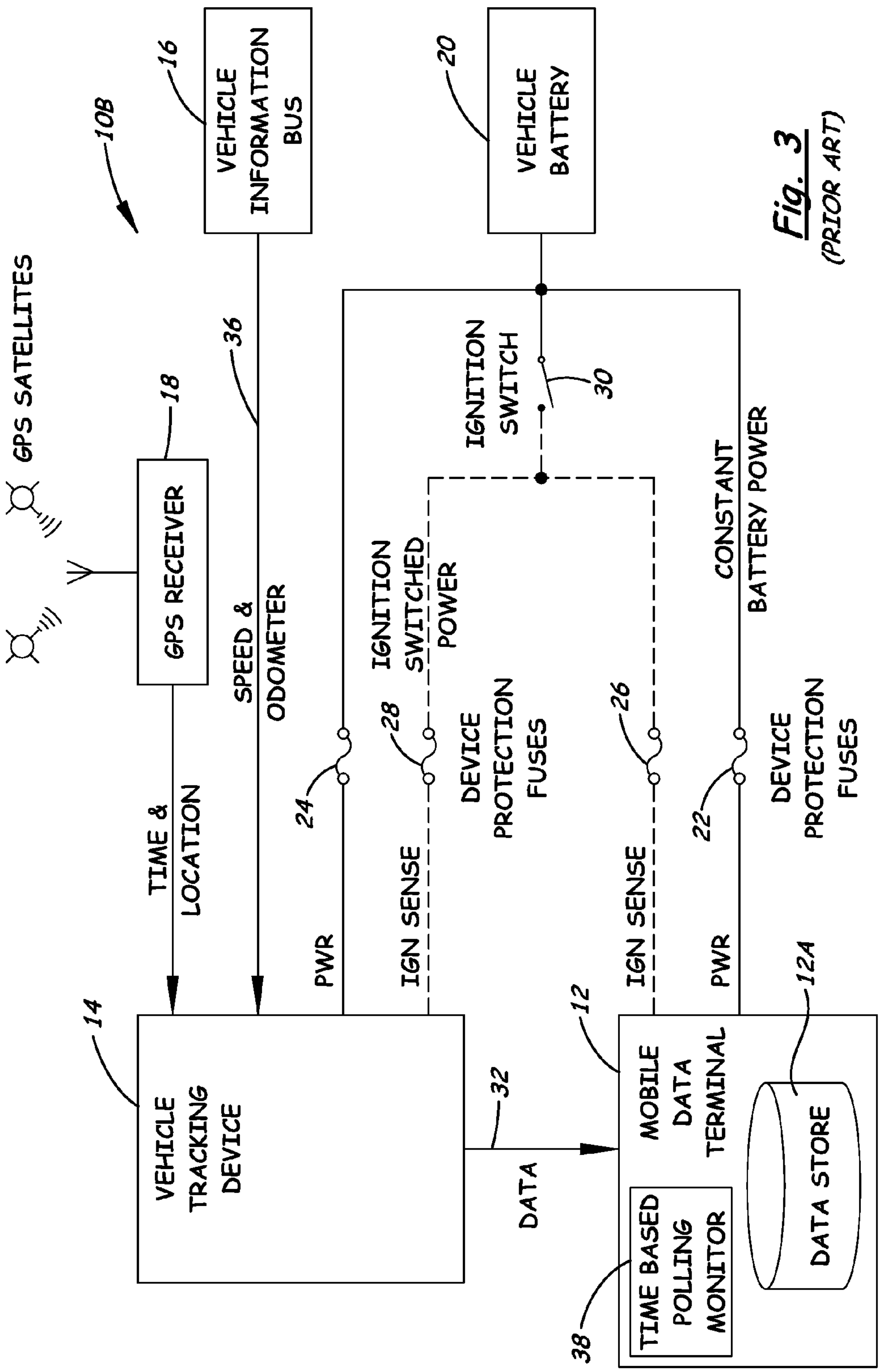
Fig. 3 (PRIOR ART)
FIG. 3 is a block diagram representation of a prior art vehicle tracking and monitoring system similar to that of FIG. 1 but after modification to incorporate a time based polling disconnection monitor.
Figure 4:
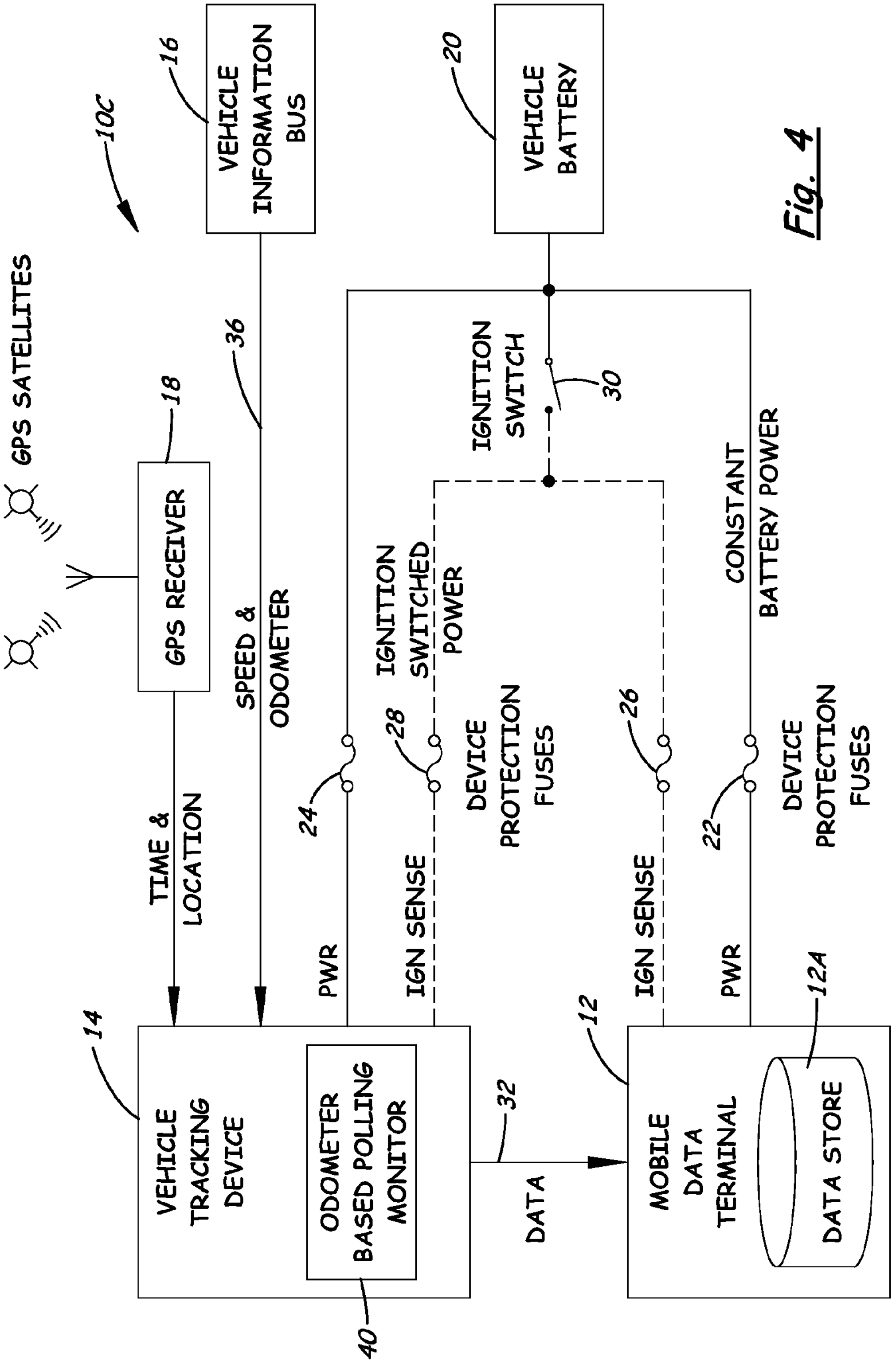
FIG. 4 is a block diagram representation of a vehicle tracking and monitoring system in accordance with the present invention after modification of the prior art system of FIG. 1 to incorporate an odometer based polling disconnection monitor for detecting connectivity status of the MDT to the vehicle.
Figure 5:
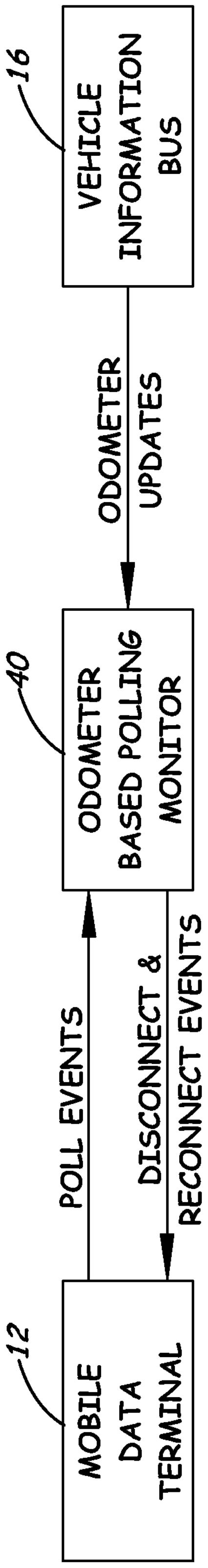
FIG. 5 is a block diagram representation of a portion of the system of FIG. 4.

Referring now to FIG. 4, there is illustrated a block diagram representation of a vehicle tracking and monitoring system, generally designated 10C, which incorporates the prior art system of FIG. 1 but additionally in accordance with the present invention modifies or enhances that system by incorporating an odometer based polling disconnection monitor 40 (hereinafter referred to as the odometer monitor) for detecting connectivity status of the MDT to the vehicle and overcoming the problems associated with the prior art approaches described heretofore. In the portion of system 10C of FIG. 4 that is represented in FIG. 5, the odometer monitor 40 is a software module defined in a data processor of the VTD 14 that is in communication with both the MDT 12 and VIS 16, listening for odometer updates and MDT poll events and monitoring the progression of the odometer value. The data processor may, for example, comprise one or more processing units and one or more non-transitory computer readable media that can store data permanently or temporarily. The odometer monitor 40 calculates distances traveled between poll events and is able to recognize when the magnitude of the distance traveled is normal (expected) and when it is abnormal (unexpected) due to events such as: (1) MDT power loss; (2) MDT failure to wake from low power mode (compromised ignition sensing); (3) MDT disconnection from the VTD 14; (4) VTD power loss; (5) VTD failure to wake from low power mode (compromised ignition sensing); and (6) VTD disconnection from the VTD 14. The odometer monitor 40 is also able to distinguish and exclude from recording false disconnections and reconnections events related to normal power cycles. These are excluded because the vehicle typically does not move during these and it is the measuring of distance traveled that is an important feature of the detection method.

Figure 6:
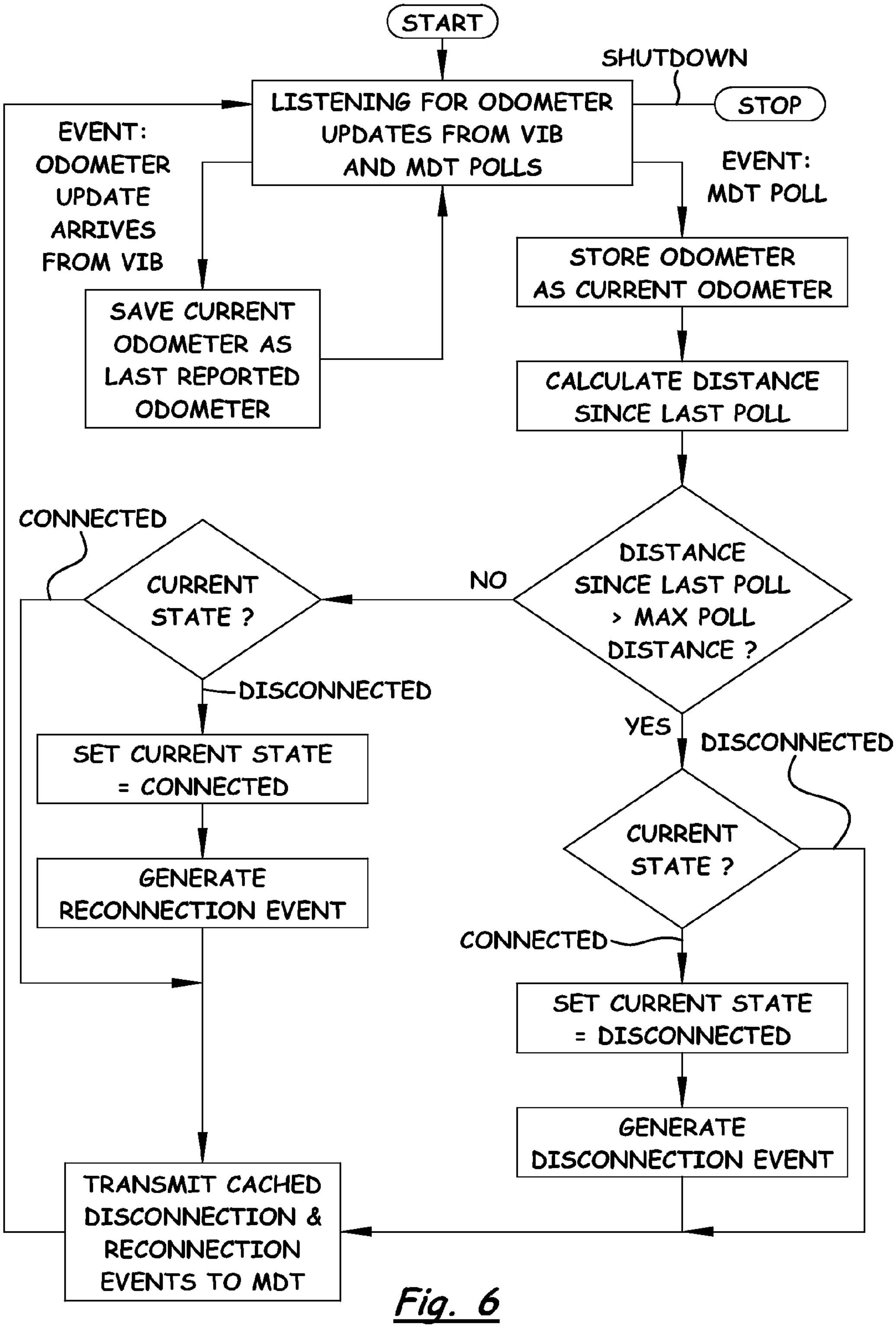
FIG. 6 is a flow chart representation of the steps of the method performed by the system of FIGS. 4 and 5 for detecting connectivity status of the MDT to the vehicle.

Referring to FIG. 6, there is illustrated a flow chart representation of the steps of the method of operation of the odometer monitor 40 of the system of FIGS. 4 and 5 for detecting connectivity status of the MDT to the vehicle. For distinguishing normal distances from abnormal distances, there are five values that are relevant in the detection method of FIG. 6. The first value is the Current Odometer, which is the odometer value most recently reported by the VIB 16 that typically is reported in steps of approximately 500 feet. The second value is the Last Reported Odometer, which is the odometer value last sent to the MDT in a poll response. The third value is the Distance Since Last Poll, which is the distance traveled by the vehicle since the last report of odometer to the MDT 12. The third value equals Current Odometer minus Last Reported Odometer. The fourth value is the Max Poll Distance, which is the maximum distance the vehicle could travel in the time between two MDT polls. The fifth value is the Current State, which records the current state as Connected or Disconnected.

As stated earlier above, the odometer monitor 40 is able to calculate distances traveled between poll events (distance per polling period) and also to recognize when the magnitude of the distance traveled is normal (expected) and when it is abnormal (unexpected). The maximum normal distance is the same as the Max Poll Distance. The following is an explanation of how a Max Poll Distance is determined. Since MDT polling occurs at a fixed frequency there is an expected period between polls. Also, every vehicle has a physical maximum velocity. Given these two facts, one is able to determine maximum distance the vehicle could possibly travel during one poll period. With polling frequency given to equal six polls per minute and vehicle maximum speed equal to 120 miles per hour, one can derive a polling period equal to ten seconds per poll and a vehicle maximum speed equal to 176 feet per second. One can then determine the maximum distance per polling period, or the normal (expected) distance, to be equal to 1760 per poll, and distances above this to be abnormal (unexpected) distances.

Basically, the odometer monitor 40 listens for successive odometer value updates from the VIB 16 via connection 36 and successive timed poll events from the MDT 12 via data connection 32. Whenever a MDT poll event arrives at the odometer monitor 40 in the VTD 14, the next odometer value update (Current Odometer value) received at the odometer monitor 40 from the VIB 16 is stored in a memory in the VTD 14 (the odometer monitor 40 will not store an odometer value update from the VIB 16 unless it first receives a poll event from the MDT 12, a situation as expressed by the graphs in FIGS. 9 and 10), compared to the Last Reported Odometer value by the odometer monitor 40, and the Distance Since Last Poll value is calculated. This calculated distance is compared to the Max Poll Distance value. If, on the one hand, after the last operation of the odometer monitor 40 the system 10C had been found to be in a connected state and now the Distance Since Last Poll value exceeds the Max Poll Distance value, then vehicle has moved more than would be expected (an abnormal distance) and occurred without the knowledge of the MDT 12. So the MDT 12 must have been in a physically or electrically disconnected state with respect to the vehicle. However, if, on the other hand, after the last operation of the odometer monitor 40 the MDT 12 had been found to be in a disconnected state with the vehicle and now the Distance Since Last Poll value is within the Max Poll Distance value, then the vehicle has moved with the knowledge of MDT 12. So the MDT 12 must now be in a reconnected state with the vehicle. As the system 10C transitions in and out of the connected state Disconnection and Reconnection events are generated and queued within the VTD 14 for transmission to the MDT 12.

Figure 7:
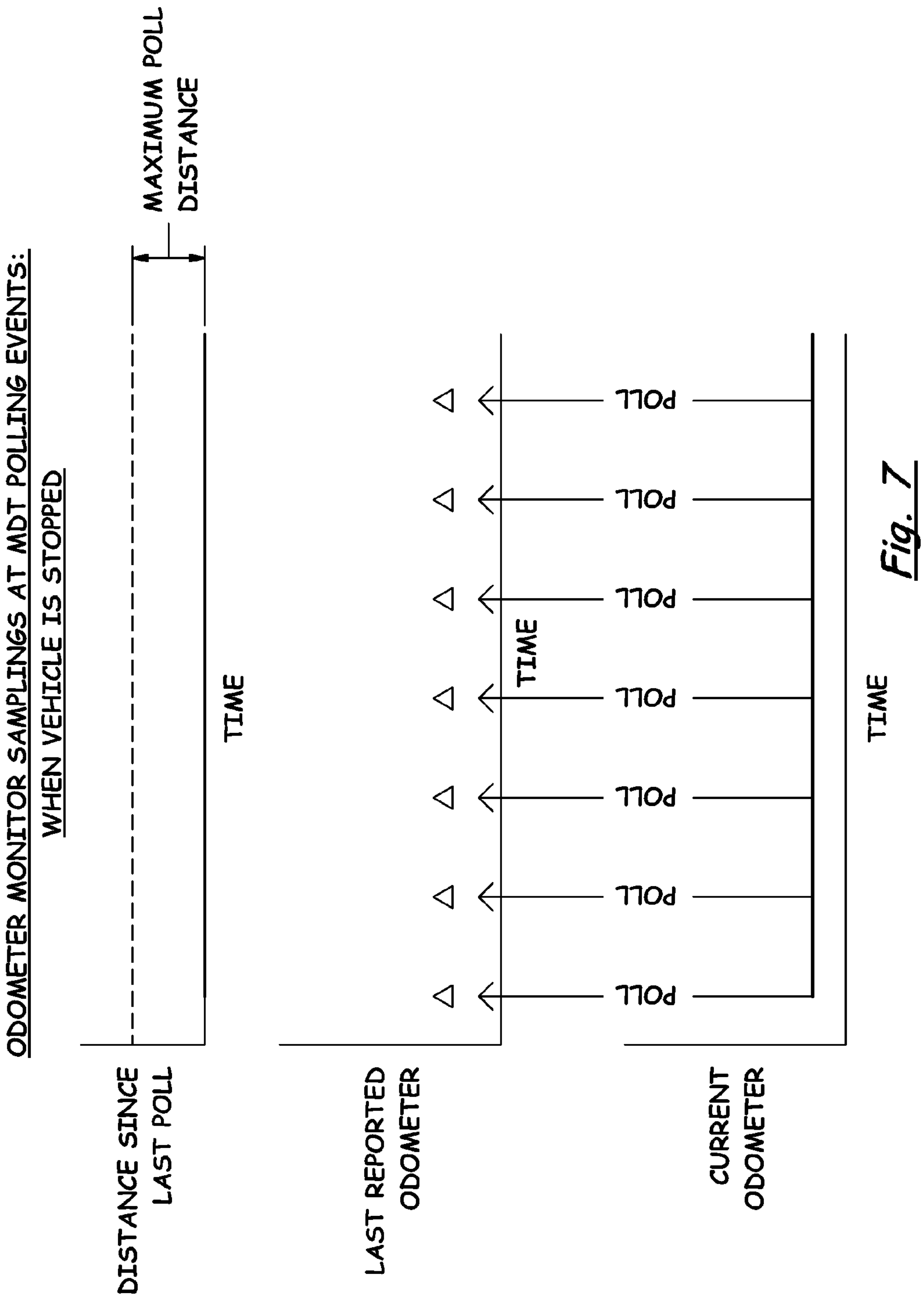
FIG. 7 shows graphs of examples of odometer monitor samplings at MDT polling events and of related maximum poll distance when the vehicle is stopped.
Figure 8:
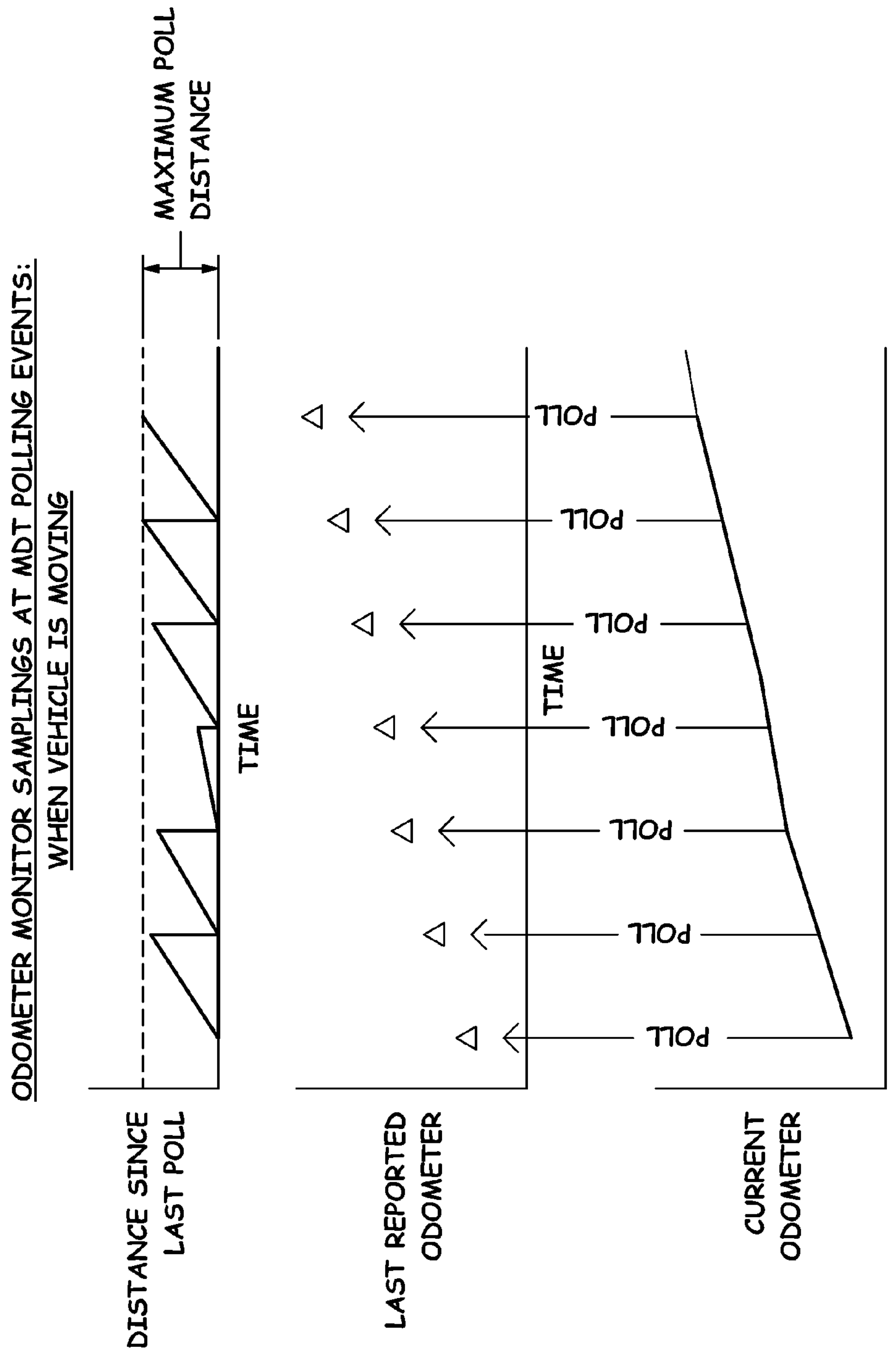
FIG. 8 shows graphs of examples of odometer monitor samplings at MDT polling events and of related maximum poll distance when the vehicle is moving.
Figure 9:
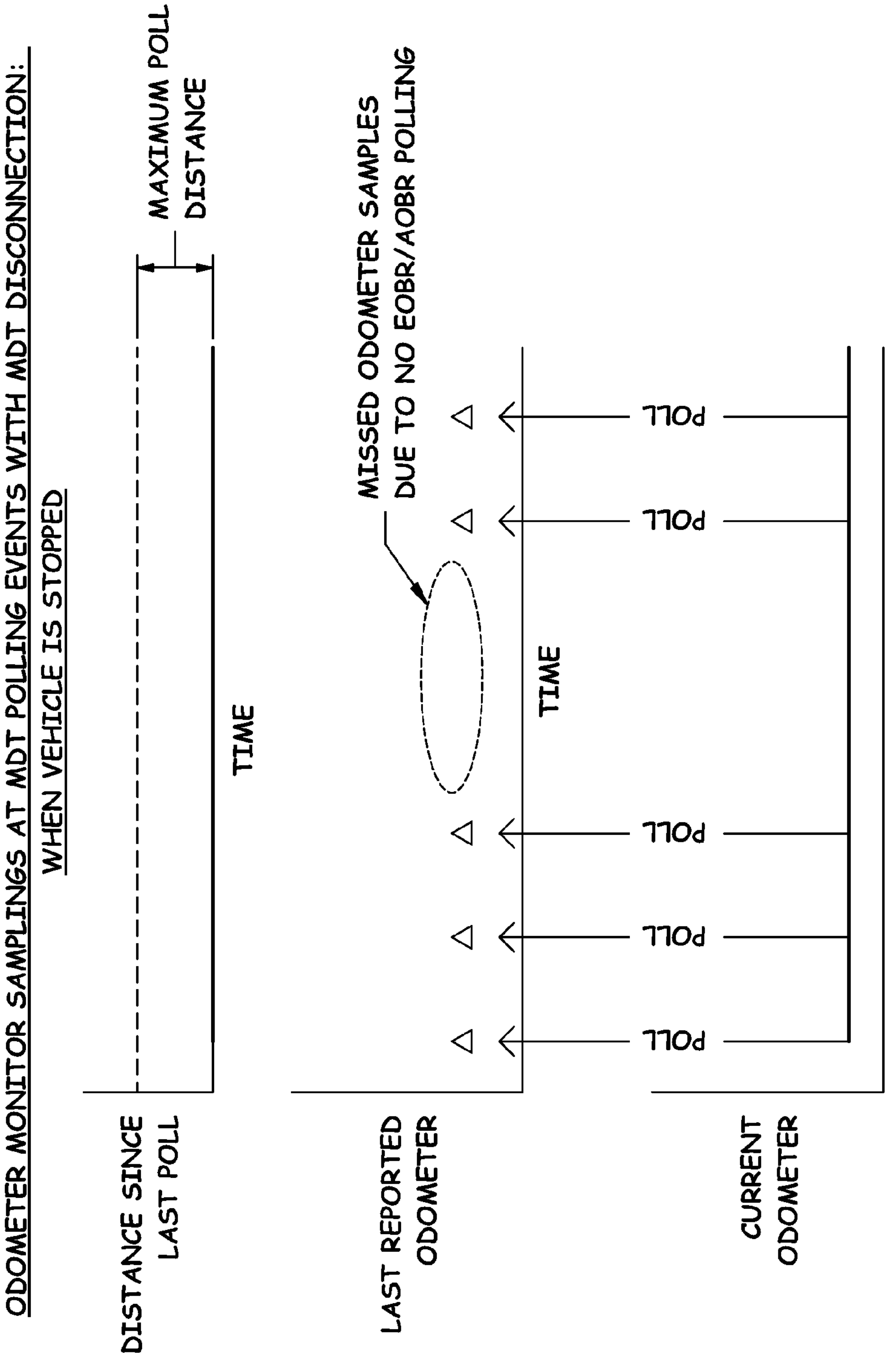
FIG. 9 shows graphs of examples of odometer monitor samplings at MDT polling events with MDT disconnection and of related maximum poll distance when the vehicle is stopped.
Figure 10:
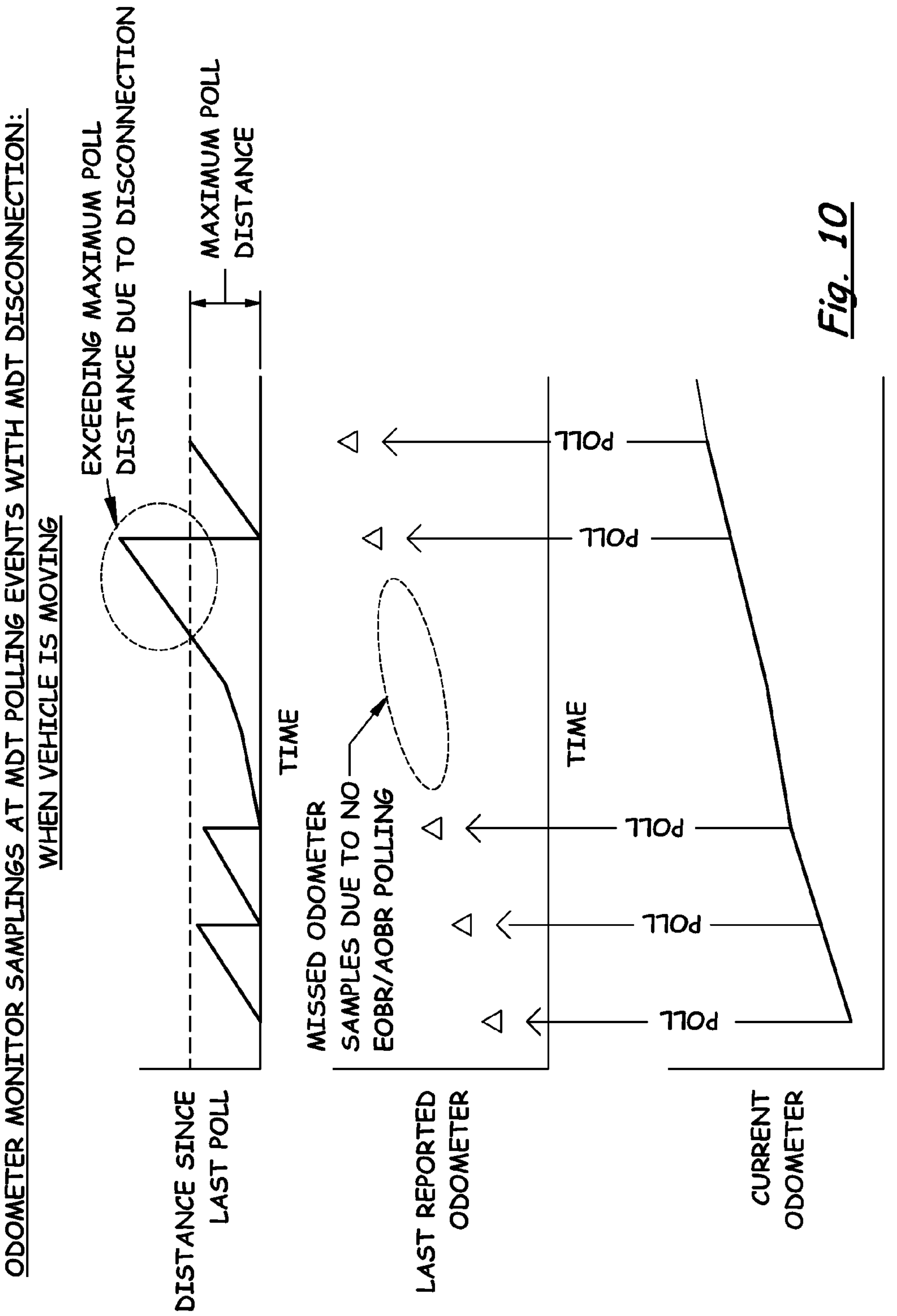
FIG. 10 shows graphs of examples of odometer monitor samplings at MDT polling events with MDT disconnection and of related maximum poll distance when the vehicle is moving.
Figure 11:
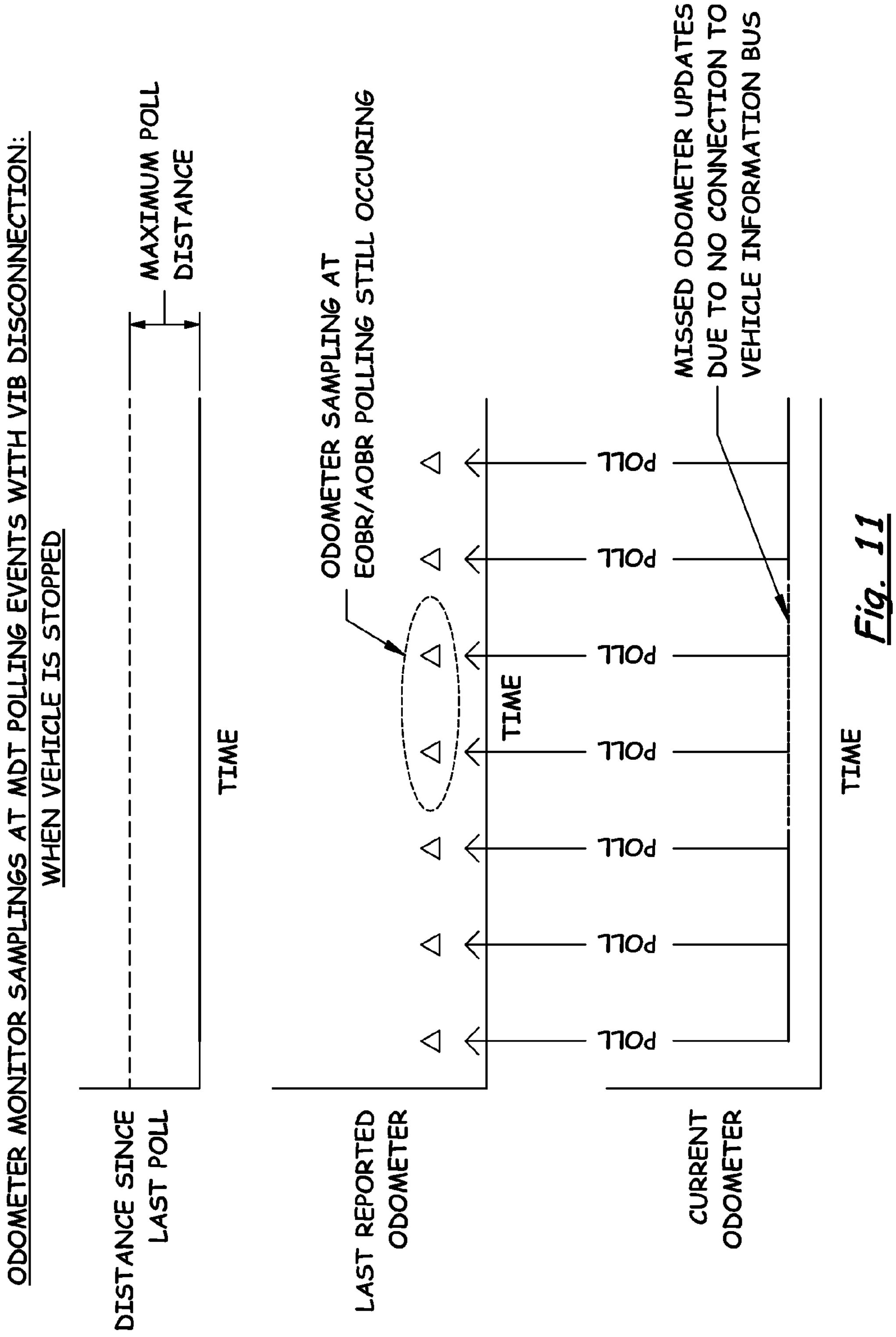
FIG. 11 shows graphs of examples of odometer monitor samplings at MDT polling events with VIB disconnection and of related maximum poll distance when the vehicle is stopped.
Figure 12:
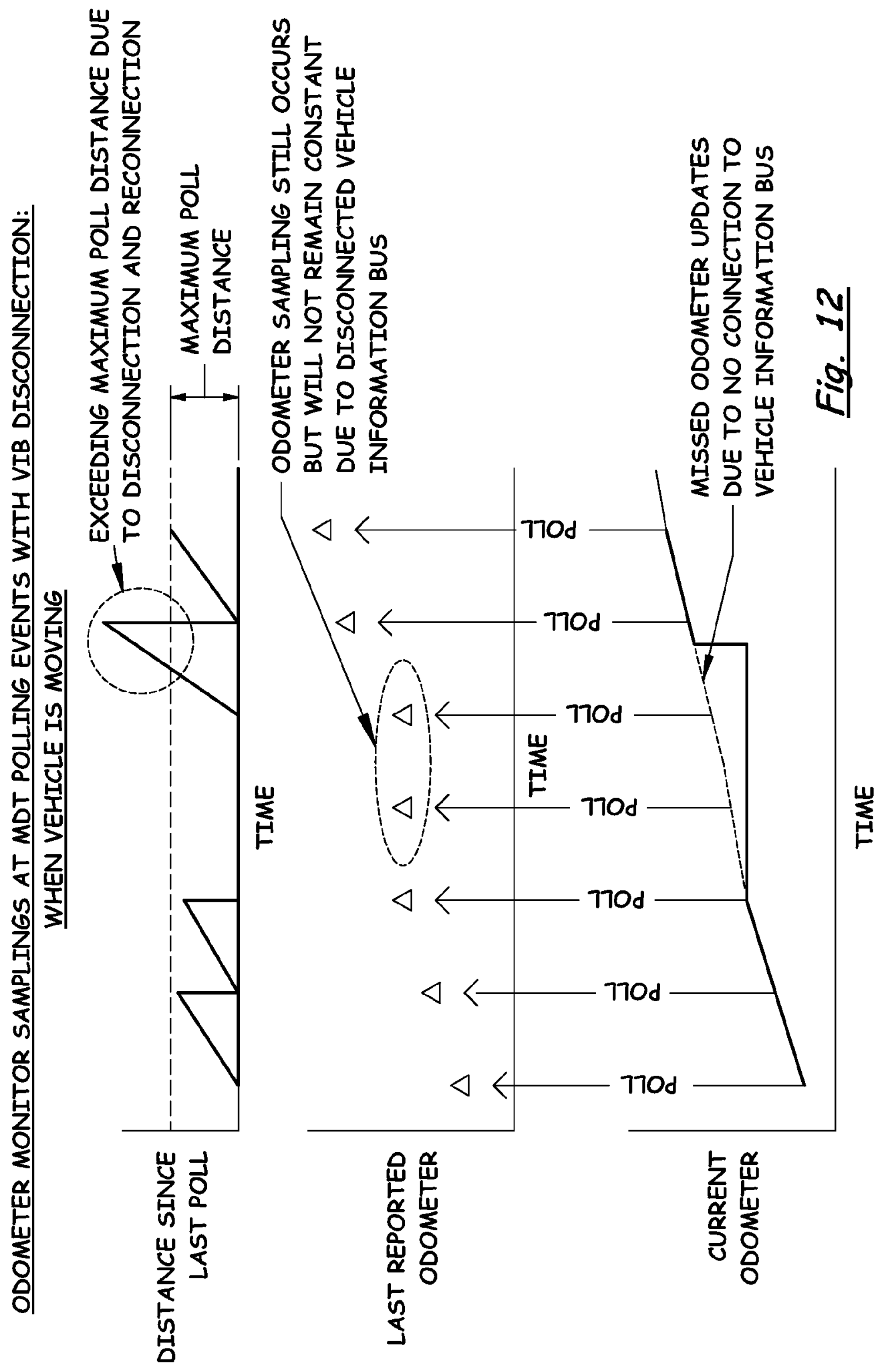
FIG. 12 shows graphs of odometer monitor samplings at MDT polling events with VIB disconnection and of related maximum poll distance when the vehicle is moving.

FIG. 7 illustrates that successive Current Odometer values and Last Reported Odometer values remain unchanged at MDT successive polling events when the vehicle is stopped. Also, the Distance Since Last Poll is unchanged and within the Max Poll Distance when the vehicle is stopped. FIG. 8 illustrates the successive Current Odometer values and Last Reported Odometer values increase from one to the next at MDT successive polling events when the vehicle is moving and there is no MDT disconnection from the vehicle. Also, the Distance Since Last Poll remains within the Max Poll Distance when the vehicle is moving and there is no MDT disconnection from the vehicle. FIG. 9 illustrates Current Odometer values and Last Reported Odometer values which include missing Last Reported Odometer values due to interruption of the MDT successive polling events, even though the vehicle is stopped, where there is MDT disconnection. Also, the Distance Since Last Poll is unchanged and within the Max Poll Distance when the vehicle is stopped. FIG. 10 illustrates Current Odometer values and Last Reported Odometer values which include missing Last Reported Odometer values due to interruption of the MDT successive polling events when the vehicle is moving and where there is MDT disconnection. Also, the Distance Since Last Poll exceeds Max Poll Distance when the vehicle is moving and where there is MDT disconnection. FIG. 11 illustrates Current Odometer values and Last Reported Odometer values which include missing Current Odometer values due to VIB disconnection when the vehicle is stopped, even though odometer sampling at MDT polling is still occurring. Also, the Distance Since Last Poll is unchanged and within the Max Poll Distance when the vehicle is stopped. FIG. 12 illustrates Current Odometer values and Last Reported Odometer values which include missing Current Odometer values due to VIB disconnection when the vehicle is moving, even though odometer sampling at MDT polling is still occurring but Last Reported Odometer values during the missing odometer updates remain constant due to the disconnected VIB.

The following explanation of the operation of the system and method of FIGS. 4-6 during various disconnection scenarios will further contribute to understanding thereof. In a first scenario, the situation is that the power or ignition sense is compromised at the MDT 12. In other words, the MDT power is affected by removal of the fuse 22 or the MDT ignition sense is affected by removal of the fuse 26. In these cases, the MDT 12 is not operational and ceases sending regular polling requests to the VTD 14. This will result in the odometer monitor 42 within the VTD 14 to stop updating the Last Reported Odometer values and if the vehicle starts moving the Distance Since Last Poll values will soon exceed the Max Poll Distance value, resulting in a disconnection event. When the removed fuse 22 or 26 is replaced, the MDT 12 will become operational and start polling the VTD 14. This will cause the odometer monitor 40 to regularly update the Last Reported Odometer values. Soon thereafter the Distance Since Last Poll value will be calculated and will be within the Max Poll Distance value or threshold, resulting in a reconnection event. The first scenario is depicted in the graphs of FIG. 9 when the vehicle is stopped and graphs of FIG. 10 when the vehicle starts moving.

In a second scenario, the situation is that the data cable connection 32 between the MDT 12 and the VTD 14 is disconnected at either end. In this case, the MDT 12 is powered and operational and attempting to send regular polling requests but these are failing due to the disconnection. The MDT 12 can warn the driver of this situation immediately so the driver can take corrective backup action. The VTD 14 stops receiving poll requests and the effects and outcomes are the same as in the first scenario, namely, a disconnection event. When the connection 32 is re-established (data cable is replaced or reconnected), the polling is re-established to the VTD 14 and the outcome is the same as in the first scenario, namely, a reconnection event.

In a third scenario, the situation is that the power or ignition sense is compromised at the VTD 14. In other words, the VTD power is affected by removal of the fuse 24 or the VTD ignition sense is affected by removal of the fuse 28. In these cases, the VTD 14 is not operational and does not respond to MDT poll requests. The MDT 12 can warn the driver of this situation immediately so the driver can take corrective backup action. The odometer monitor 40 is also not operating and unable to produce a disconnection Event, so the disconnection event will be produced at reconnection. When the removed fuse 24 or 28 is replaced, the VTD 14 and odometer monitor 40 become operational. The first odometer update arriving from the VIB 16 will result in a large Distance Since Last Poll value calculation that exceeds the Max Poll Distance (if the vehicle was moved significantly during the disconnection) resulting in a disconnection and reconnection event.

In a fourth scenario, the situation is that communication of the VTD 14 with the VIB 16 is compromised. In other words, the cable connection 36 between the VIB 16 and VTD 14 is disconnected. In this case, the VTD 14 is operational and responding to MDT poll requests but is unable to update Current Odometer values. The VTD 14 can detect this situation and report it to the MDT 12 so that the driver can take corrective backup action. The odometer monitor 40 is operating but will be unable to produce a disconnection event at this time because the Current Odometer value is not updating and will not result in increasing the Distance Since Last Poll value. This disconnection event will be reported at reconnection. When the connection 36 is re-established, the first odometer update arriving from the VIB 16 will result in a large Distance Since Last Poll value calculation that exceeds the Max Poll Distance value (if the vehicle was moved significantly during the disconnection), resulting in a disconnection and reconnection event. The fourth scenario is depicted in the graphs of FIG. 11 when the vehicle is stopped and graphs of FIG. 12 when the vehicle starts moving.

Figure 13:
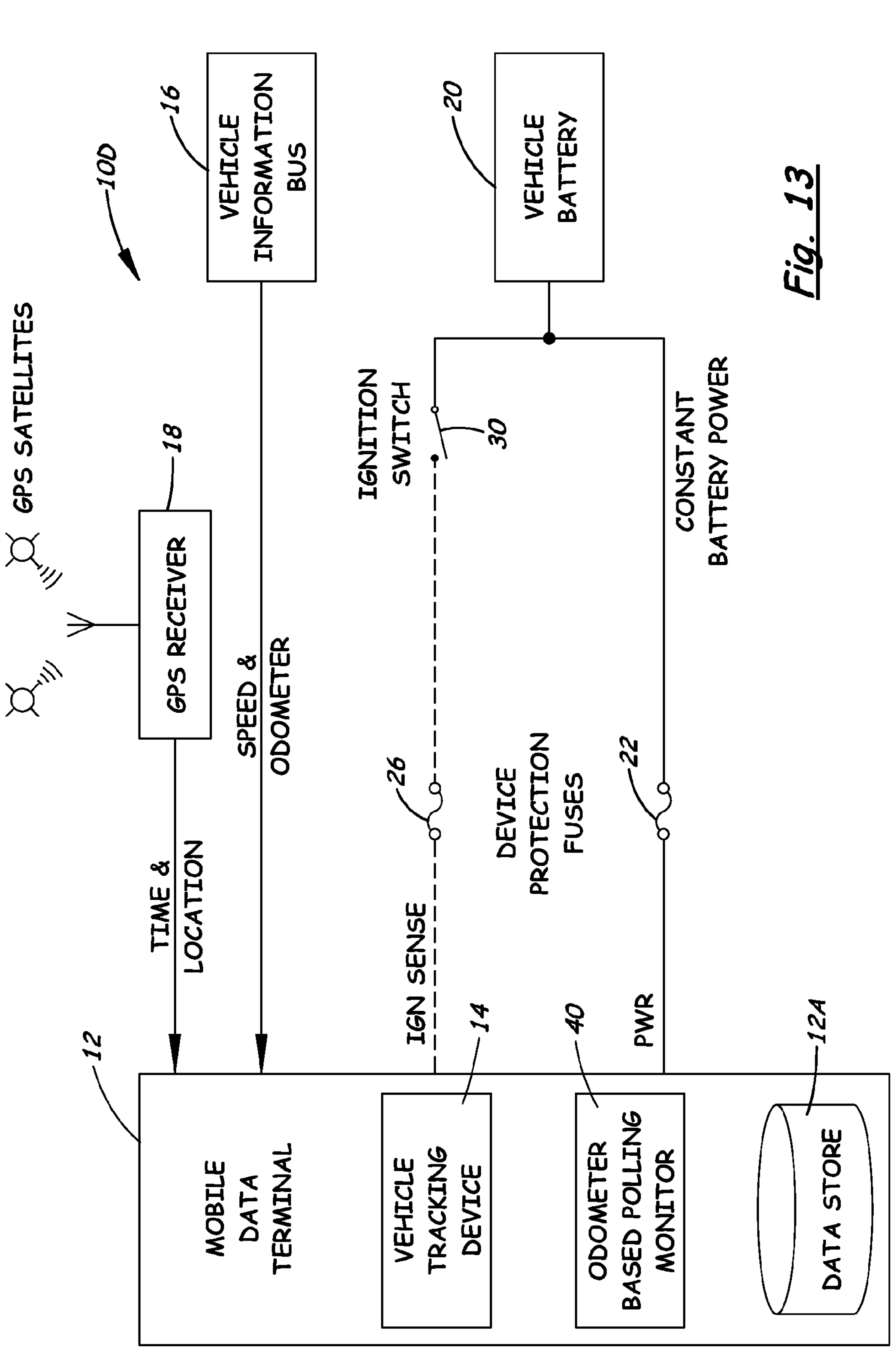
FIG. 13 is a block diagram representation of an alternative embodiment to that of the vehicle tracking and monitoring system shown in FIG. 4.

Referring now to FIG. 13, there is illustrated a block diagram representation of a vehicle tracking and monitoring system, generally designated 10D, which is an alternative or modified embodiment to that of FIG. 4. The system 10D of FIG. 13 does not include a separate VTD 14. Instead, the system 10D incorporates the functionality of the VTD 14 and its odometer monitor 40 within the MDT 12. This alternative embodiment eliminates one-half of the potential disconnection points and cases as the following cables and connections to the VTD 14 are no longer exposed via cables: (1) data cable 32; (2) power connections and fuse 24; and ignition sense connection and fuse 28. Also, the GPS receiver 18 is now connected to the MDT 12. The polling between the MDT 12 and the VTD 14 still occurs, but not exteriorly; it is now contained interiorly or entirely within the MDT 12.

It should be understood that in light of the foregoing description and in the claims that follow the recitation of the VTD 14 as a "device" and as being "connected" to the MDT 12 and to the VIB 16 is meant to be interpreted to cover the instance where the VTD 14 is provided as a separate entity as per FIG. 4 as well as the instance where the VTD 14 is not as a separate entity as per FIG. 13.

Figure 14:
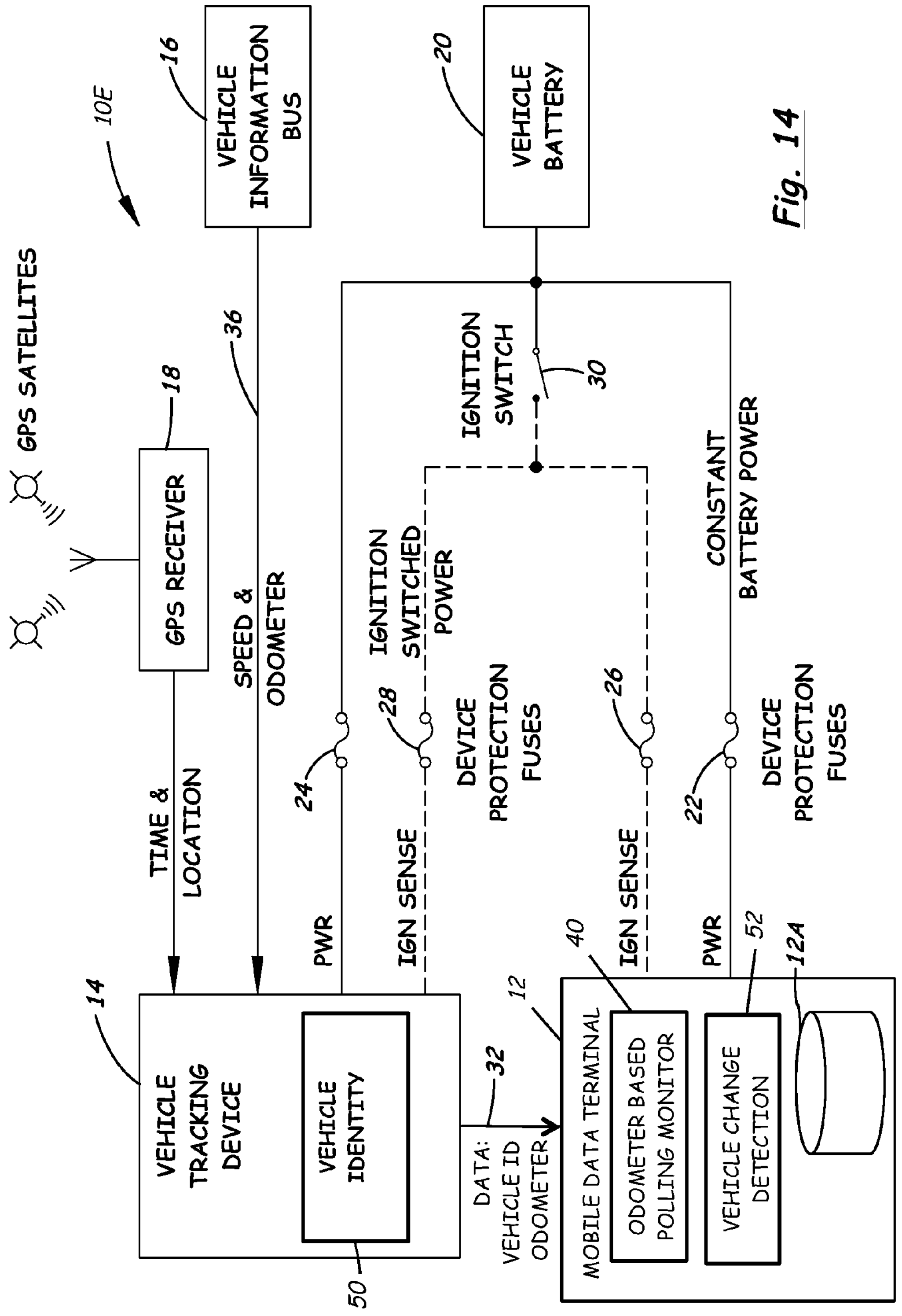
FIG. 14 is a block diagram representation of an alternate embodiment of the vehicle tracking and monitoring system in which the odometer based polling monitor is located in the MDT.

Referring now to FIG. 14, an alternate embodiment 10E is shown, in which the odometer monitor 40 is located in the MDT 12 and the MDT is separate from the VTD 14. The odometer monitor 40 is a software or firmware module defined in a data processor of the MDT 12 that is in communication with the VTD 14. The odometer monitor 40 listens for poll events internally generated by the MDT or the odometer monitor, listens for odometer updates from the VTD 14 and monitors the progression of the odometer value. The data processor in which the odometer monitor is embodied may, for example, comprise one or more processing units and one or more non-transitory computer readable memories located in the MDT 12.

Many of the components are the same as in the embodiment of FIG. 4, however, since the odometer monitor 40 is now a separate device from the VTD 14, and since the MDT may be moved from vehicle to vehicle, a way is needed to relate the odometer reading to a specific vehicle. This is achieved by including a vehicle identity 50 in the VTD 14. The vehicle identity 50 may be, for example, a non-volatile computer readable memory or firmware storing a string of characters or code that identifies the vehicle in which the VTD 14 is installed. The vehicle identity 50 may be programmed by a fleet manager's MDT or other programming device, or may possibly be retrieved automatically from the VIB 16. As well, the MDT 12 now includes a vehicle change detection module 52, which reads data from the vehicle identity 50. This is so that the MDT 12 can check that a sequence of odometer readings all come from the same vehicle. The MDT 12 can check, if there is a sudden jump forwards or backwards in the odometer reading, whether the MDT has been connected to a different vehicle. The vehicle change detection module 52 may, for example, be embodied in one or more processing units and one or more non-transitory computer readable media located in the MDT 12, and may be embodied inside or outside of the odometer monitor 40.

The odometer monitor 40 listens for poll events generated within the MDT 12. These poll events may be generated by a clock running in the MDT, which generates the events at a regular frequency. The clock may be alternately incorporated in the odometer monitor itself.

A further benefit of embodiment 10E is that a simpler VTD 14 is required. Instead of requiring the VTD 14 to perform calculations as in previously described embodiments having the odometer monitor in the VTD, all that is needed is a relatively simple modification to an off-the-shelf VTD in order to include a vehicle identity. This may reduce installation costs. It is also envisaged that such a VTD and/or vehicle identity 50 may be integral with the vehicle, installed at the time of manufacture of the vehicle. In this case, the vehicle identification number may either be retrieved and stored in the vehicle identity 50 or obtained, temporarily stored and transmitted to the MDT 12 on demand. If the vehicle identity 50 is outside the VTD 14, then an entirely off-the-shelf VTD may be used. The GPS 18 may also be integral with the vehicle as manufactured, or it may be part of the VTD 14.

Figure 15:
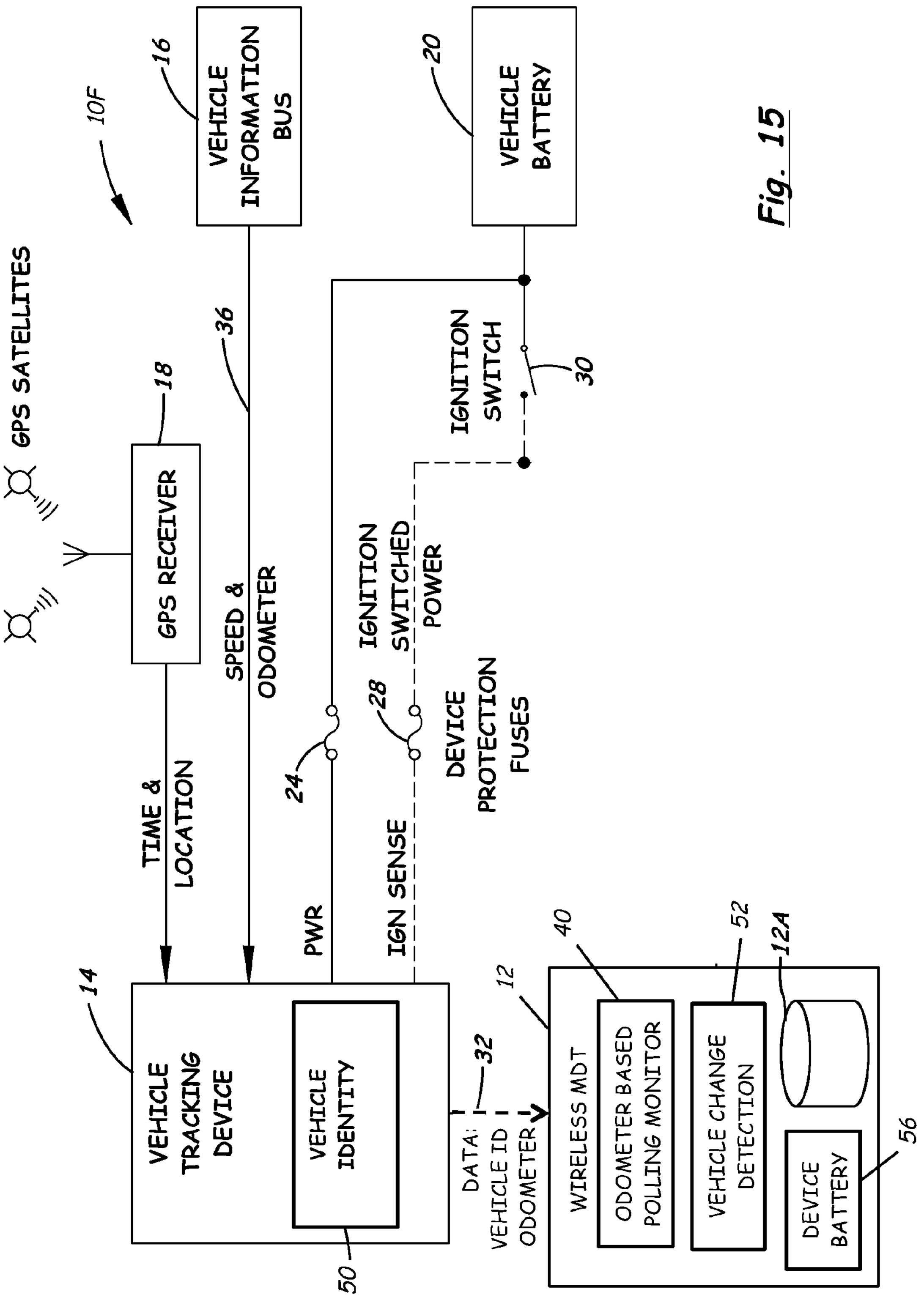
FIG. 15 is a block diagram representation of an alternate embodiment of the vehicle tracking and monitoring system in which the odometer based polling monitor is located in the MDT, which in turn is connected wirelessly to the VTD.

Now referring to FIG. 15, an embodiment 10F of the system is shown, in which the MDT 12 is wirelessly connected to the VTD 14. As described above in relation to FIG. 14, the VTD 14 includes vehicle identity 50, or the vehicle identity is located separately from the VTD in the vehicle but is detected by it. Since the MDT 12 is now wireless, it requires its own power supply, such as battery 56, and does not need to be connected to the vehicle battery 20. However, if the MDT battery 56 is getting low, the MDT 12 may be connected to the vehicle battery 20 for recharging. In some embodiments, the physical connection of the MDT 12 to the vehicle's battery 20 may be made obligatory in order for the ignition to work. The wireless connection between the VTD 14 and the MDT 12 may use a Bluetooth™ wireless protocol, NFC (Near Field Communication), wi-fi or a proprietary method of wireless communication.

The benefit of the embodiment 10F of FIG. 15 is that drivers may have their own allocated or personal MDTs. It will allow a replacement MDT to be used in a vehicle if the existing MDT needs repairing or servicing. In practice, for example, such an MDT 12 having an odometer monitor 40 may be placed in a cradle on the dashboard of a vehicle, providing data and power connections to it from the vehicle.

One benefit of a wireless MDT 12 is that a driver could use a personal smart phone, tablet or other mobile computing device as the MDT. An application downloaded onto the personal mobile device would then provide the functions of the MDT 12 and incorporated modules such as the odometer monitor 40 and the vehicle change detection module 52. In this case, a GPS device present in the personal mobile device may be used instead of the GPS device 18 attached to the vehicle.

Figure 16:
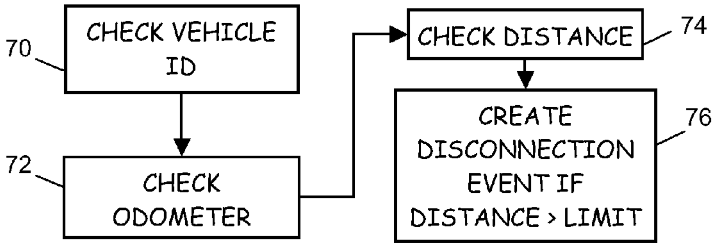
FIG. 16 is a flow chart representation of the core steps of the method performed by the systems of FIGS. 14 and 15 for detecting connectivity status of the MDT to the vehicle.

Referring to FIG. 16, a flow chart representation of the core steps of the method performed by the systems of FIGS. 14 and 15 is shown. Step 70 entails the MDT 12 checking the identity of the vehicle to which it is connected, by retrieving or receiving data from the vehicle identity 50. In step 72, the MDT 12 checks the odometer reading by way of its odometer monitor 40 obtaining a value for the odometer from the VIB 16 via the VTD 14. In step 74, the odometer monitor 40 in the MDT 12 calculates the distance the vehicle appears to have travelled since a reading from the odometer was last obtained, and checks whether this distance is within the permissible distance, i.e. the Max Poll Distance. In step 76, the MDT creates a disconnection event if the vehicle is calculated to have travelled more then the Max Poll Distance. The steps shown in FIG. 16 do not necessarily have to be performed in the sequence shown, but instead may be performed in a different order. Other steps may be added, as shown in more detail in the example of FIG. 17.

Figure 17:
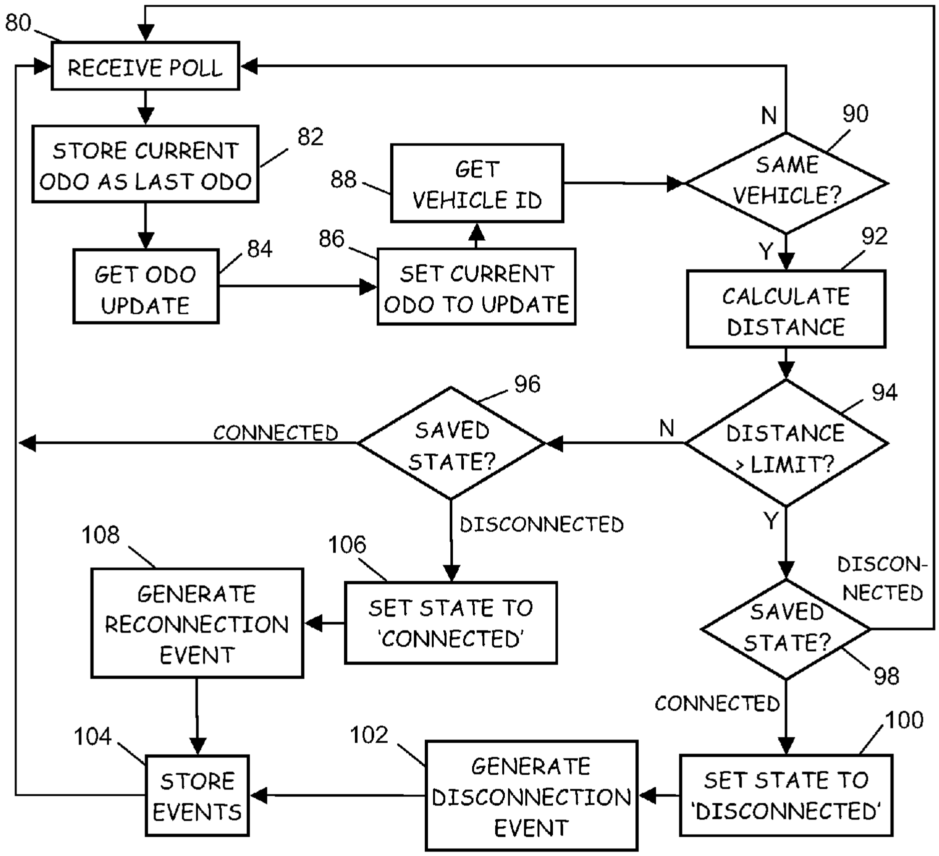
FIG. 17 is a more detailed flow chart representation of the steps of the method performed by the systems of FIGS. 14 and 15 for detecting connectivity status of the MDT to the vehicle.

Referring now to FIG. 17, and starting from step 80, the odometer monitor 40 receives a poll in the form of a clock signal from the MDT 12. Upon receiving the clock signal, the odometer monitor 40 stores the existing, previously stored current odometer reading as the last reported odometer reading in step 82. In step 84, the odometer monitor 40 retrieves a new, updated value of the odometer from the VTD 14 and, in step 86, stores this updated value as the current odometer reading. In step 88, the vehicle change detection module 52 of the MDT 12 obtains the vehicle identification from the vehicle identity module 50. A test is then performed in step 90 as to whether the vehicle ID obtained in step 88 is the same as the vehicle ID last obtained from the VTD 14 and stored in the MDT, in relation to the last poll. If the vehicle to which the MDT 12 is connected is a different vehicle compared to the immediately preceding poll, then no other steps are taken other than to return the process to step 80, in which a subsequent poll is received.

Now, if it is found in step 90 that the vehicle is the same vehicle as before, then the process advances to step 92, in which the distance between the current odometer reading and the last odometer reading is calculated. In test 94, if the calculated distance is below the predetermined limit defined by the Max Poll Distance, then the process moves to decision point 96, in which the saved state is obtained. If the saved state is "Connected" then the process reverts to step 80 in which the subsequent poll signal is awaited and received. In this situation, connections are good and the vehicle is being operated normally. Going back to test 94, if the calculated distance is above the predetermined limit, then the saved state is determined at decision point 98. If the saved state is "Disconnected" there is no need to change the state and the process reverts again to step 80. However, if at step 98 the saved state is "Connected" then in step 100, the odometer monitor sets the state to be "Disconnected" to represent the fact that the vehicle has moved more than the Max Poll Distance between two successive poll events. Even though the MDT 12 and VTD 14 may at this moment be physically connected, the saved state, being "Disconnected" signifies that a disconnection event has occurred. As in prior embodiments disclosed, actual physical disconnections while the vehicle moves less than the predetermined distance will not be recorded. In step 102, the odometer monitor generates a disconnection event, which is stored in step 104 for later transmission to a fleet manager, for example. After this, the process reverts to step 80 to receive the following poll event.

If, at decision point 96, the saved state is determined to be "Disconnected", then the saved state is reset to "Connected" in step 106. Point 96 would only ever be reached if the distance between the stored current and last odometer readings is below (or perhaps equal to) the predetermined limit. After step 106, a corresponding reconnection event is generated in step 108, signifying that the MDT 12 is properly connected to the VTD 14, and the reconnection event is stored in step 104 for later access.

A first scenario is where the MDT 12 is without power, due to a disconnection from the vehicle battery 20 or, if it is wireless, due to a discharged device battery 56. The odometer monitor 40 will not be polling as it will not be powered, so will not be receiving odometer updates. If the MDT 12 is then reconnected to a power source or its battery recharged, without the vehicle having been moved or having been moved less than the Max Poll Distance, then the next odometer update will not trigger a disconnection event. However, if the vehicle has moved more than the Max poll distance, then a disconnection event will be generated.

A second scenario is where the MDT 12 is disconnected from the VTD 14. The odometer monitor 40 will be polling as it will be powered, but will not be receiving odometer updates. If the MDT 12 is then reconnected to the VTD 14, without the vehicle having been moved or having been moved less than the Max Poll Distance, then the next odometer update will not trigger a disconnection event. However, if the vehicle has moved more than the Max poll distance, then a disconnection event will be generated.

A third scenario, in which the VTD 14 is not powered, is similar to the second scenario.

A fourth scenario is where the VTD 14 is disconnected from the VIB 16. The odometer monitor 40 will be polling as it will be powered, but will not be receiving odometer updates. If the VTD 14 is then reconnected to the VIB 16, without the vehicle having been moved or having been moved less than the Max Poll Distance, then the next odometer update will not trigger a disconnection event. However, if the vehicle has moved more than the Max Poll Distance, then a disconnection event will be generated.

Upon determination of the connectivity status, it may be transmitted, or stored then later transmitted to a remote server, from which it may be retrieved by a fleet manager. Connectivity status of the MDT 12 relative to the vehicle may relate specifically to a direct connection 22, 26 from the vehicle's battery 20 to the MDT, an indirect connection to the vehicle via a data connection to the VTD 14, or an indirect connection via both the data connection to the VTD and the VTD's data or power connection to the vehicle. If any of such connections are broken, the effect can be considered a disconnection of the MDT 12 relative to the vehicle.

In the description herein, embodiments disclosing specific details have been set forth in order to provide a thorough understanding of the invention, and not to provide limitation. However, it will be clear to one having skill in the art that other embodiments according to the present teachings are possible that are within the scope of the appended claims. All parameters, dimensions, materials, and configurations described herein are examples only and actual values of such depend on the specific embodiment. Steps in the flowcharts may be performed in a different order, some steps may be omitted and others added. Notably, certain steps have not been shown in the flowcharts for reasons of clarity. Functional modules in the system may be located differently to those shown in the embodiments described.

The descriptions above are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions, or in any combination thereof. Furthermore, the media in which the instructions are stored are non-transitory media.

What is claimed is:

1. A system for monitoring connectivity status of a mobile data terminal to a vehicle, comprising:

a vehicle tracking device connectable to a vehicle information bus of a vehicle and operable to receive odometer update values from the vehicle via said bus;

a vehicle identity module in the vehicle tracking device for storing an identification of the vehicle;

a mobile data terminal connected to the vehicle tracking device and operable to receive odometer update values from the vehicle tracking device; and a preset maximum distance defined in said mobile data terminal;

said mobile data terminal being operable to:

detect a series of timed poll events originating in the mobile data terminal;

receive an odometer update value from the vehicle tracking device corresponding to each poll event;

verify that a last and a penultimate of said odometer update values are from the vehicle;

calculate a distance between the last and penultimate odometer update values;

make a determination of connectivity status of said mobile data terminal relative to the vehicle based on whether the distance is greater than or less than the preset maximum distance; and store the connectivity status.

2. The system of claim 1 wherein the mobile data terminal is operable to transmit said connectivity status to a remote server.

3. The system of claim 1 wherein the value of the preset maximum distance equals the value of the maximum expected distance the vehicle can travel during the time between two successive timed poll events.

4. The system of claim 1 wherein said connectivity status is connected if the distance is less than the preset maximum distance.

5. The system of claim 1 wherein said connectivity status is disconnected if the distance is greater than the preset maximum distance.

6. The system of claim 1 wherein said connectivity status indicates that said mobile data terminal is reconnected if the distance is less than the preset maximum distance and was previously calculated to be greater than the preset maximum distance.

7. A method for monitoring connectivity status of a mobile data terminal to a vehicle, comprising the steps of:

defining a preset maximum distance in a mobile data terminal connectable to a vehicle;

detecting a series of timed poll events originating in the mobile data terminal;

receiving an odometer update value from a vehicle tracking device corresponding to each poll event;

verifying that a last and a penultimate of said odometer update values are from the vehicle;

calculating a distance between the last and penultimate odometer update values;

making a determination of connectivity status of said mobile data terminal relative to the vehicle based on whether the distance is greater than or less than the preset maximum distance; and storing the connectivity status.

8. The method of claim 7 further comprising the step of transmitting said connectivity status to a remote server.

9. The method of claim 7 wherein the value of the preset maximum distance equals the value of the maximum expected distance the vehicle can travel during the time between two successive timed poll events.

10. The method of claim 7 wherein said connectivity status is connected if the distance is less than the preset maximum distance.

11. The method of claim 7 wherein said connectivity status is disconnected if the distance is greater than the preset maximum distance.

12. The method of claim 7 wherein said connectivity status indicates that said mobile data terminal is reconnected if the distance is less than the preset maximum distance and was previously calculated to be greater than the preset maximum distance.

13. One or more non-transitory computer readable media comprising computer readable instructions, which, when executed by a processor cause a mobile data terminal in a vehicle to:

define a preset maximum distance;

detect a series of timed poll events;

receive an odometer update value from a vehicle tracking device corresponding to each poll event;

verify that a last and a penultimate of said odometer update values are from the vehicle;

calculate a distance between the last and penultimate odometer update values;

make a determination of connectivity status of said mobile data terminal relative to the vehicle based on whether the distance is greater than or less than the preset maximum distance; and store the connectivity status.

14. The media of claim 13 wherein the mobile data terminal is further caused to transmit said connectivity status to a remote server.

15. The media of claim 13 wherein the value of the preset maximum distance equals the value of the maximum expected distance the vehicle can travel during the time between two successive timed poll events.

16. The media of claim 13 wherein said connectivity status is connected if the distance is less than the preset maximum distance.

17. The media of claim 13 wherein said connectivity status is disconnected if the distance is greater than the preset maximum distance.

* * * * *